(12) United States Patent
Shoemaker, Jr.

(10) Patent No.: US 10,059,448 B1
(45) Date of Patent: Aug. 28, 2018

(54) RESCUE DEVICE FOR DISTRESSED SWIMMER

(71) Applicant: Stephen P. Shoemaker, Jr., Redondo Beach, CA (US)

(72) Inventor: Stephen P. Shoemaker, Jr., Redondo Beach, CA (US)

( * ) Notice: Subject to any disclaimer, the term of this patent is extended or adjusted under 35 U.S.C. 154(b) by 0 days.

(21) Appl. No.: 15/603,853

(22) Filed: May 24, 2017

(51) Int. Cl.
*B64C 39/02* (2006.01)
*B63C 9/08* (2006.01)
*B64C 27/08* (2006.01)
*B64D 1/02* (2006.01)

(52) U.S. Cl.
CPC ............. *B64C 39/024* (2013.01); *B63C 9/08* (2013.01); *B63C 9/082* (2013.01); *B64C 27/08* (2013.01); *B64D 1/02* (2013.01); *B64C 2201/027* (2013.01); *B64C 2201/108* (2013.01); *B64C 2201/128* (2013.01)

(58) Field of Classification Search
CPC .... B64C 39/024; B64C 2201/128; B64D 1/02
See application file for complete search history.

(56) References Cited

U.S. PATENT DOCUMENTS 3,295,789 A * 1/1967 Hill ...................... B64C 29/0075
244/1 R
2016/0096622 A1 * 4/2016 Richardson .............. B64D 1/02
701/2

* cited by examiner

*Primary Examiner* — Nicholas McFall
(74) *Attorney, Agent, or Firm* — Fulwider Patton LLP

(57) ABSTRACT

A pilotless drone is equipped with a life preserver or other buoyant device for delivery to a distressed swimmer. The drone includes a vacuum pump and a vacuum release mechanism to remotely release the life preserver once the drone is positioned over the swimmer. A camera on the drone can be used to locate the swimmer, and a remote control operates the release mechanism so that the operation can be performed from a remote location (such as a life guard station, vessel, etc.).

8 Claims, 2 Drawing Sheets

RESCUE DEVICE FOR DISTRESSED SWIMMER

BACKGROUND

Life guards are tasked with overseeing swimmers who are involved in various activities in the water, such as surfing, swimming, body boarding, etc. Many times these activities are participated in by adults who are experience swimmers, but due to extreme sea conditions these participants may become distressed and need assistance. This may be due to high surf, rip tides, extreme waves, or marine life, or other exigent circumstances. In these occurrences, to avoid a drowning incident time is critical to get assistance to the distressed swimmer.

Such rescue operations can also occur out in open water by coast guard personnel, who may be called upon to rescue a distressed person in high seas or other dangerous situation. Not only is time of the essence to get the person help, but the person tasked with rescuing the flailing person may himself become endangered by the surroundings and the person to be rescued. The present invention is directed to a system and method for delivering assistance to a distressed swimmer in a quick and effective manner.

SUMMARY OF THE INVENTION

Unmanned Aerial Vehicles (UAVs), or drones, are aircrafts that can be navigated without a human pilot on board the aerial vehicle. Drones can be navigated via control from the ground, using a GPS tracking system. Drones may be equipped with cameras that allow the user to record and take pictures using controlled navigation, and their current uses include hobbies and image capturing. Drones have grown in popularity in recent years, and new models have been released lately with newer and better features. Drones are navigated via their channel control and transmitter; the higher the channel control, the better the user can navigate the drone at a higher speed.

Some commercial drones are capable of carrying up to 20 kilograms of weight, and can be maneuvered quickly into an accurate position above an object using a camera. The present invention takes advantage of these newer features of drones, by using a suction system to deliver a life preserver to a distressed swimmer. A life guard, for example, can deliver a life preserver to a distressed swimmer who may be several hundred yards off shore in under a minute, far shorter than the time needed to swim the distance to the distressed swimmer. By quickly getting a life preserver to a distressed swimmer more expediently, many lives can be saved. This may also allow the life guard or rescue personnel to take a more safer approach to the distressed swimmer if the swimmer is at least partially buoyed by a life preserver rather than struggling to keep his head above water. This invention can be used by coast guard personnel, life guards, or anyone who may be tasked with overseeing the safety of swimmers in a difficult to access area.

The drone of the present invention is equipped with a radio-activated vacuum/valve release mechanism for dropping the life preserver from the drone once it is over the distressed swimmer. One preferred embodiment is a vacuum release valve where an electric pump operating on the same voltage as the drone is coupled to a suction cup that retains the life preserver suspended below the drone. A relay control switch is present that opens the valve at a command of the user, releasing the suction to drop the life preserver to the swimmer.

Other release mechanism have inherent shortcomings around water. Metal or plastic clasps or grippers can jam, fail to release, or become stuck due to sand and other debris in the release mechanism. Magnets are unreliable around water, especially salt water, and can prematurely release when subjected to wind or other forces. Using ties or cabling is impractical if the swimmer is truly distressed and unable to operate any manual tasks. Vacuum suction overcomes all of the other shortcomings and provides a reliable method to deliver the life preserver.

These and other advantages of the present invention will be made apparent in view of the detailed description of the present invention along with the accompanying drawings listed below.

DETAILED DESCRIPTION OF THE PREFERRED EMBODIMENTS

Figure 1:
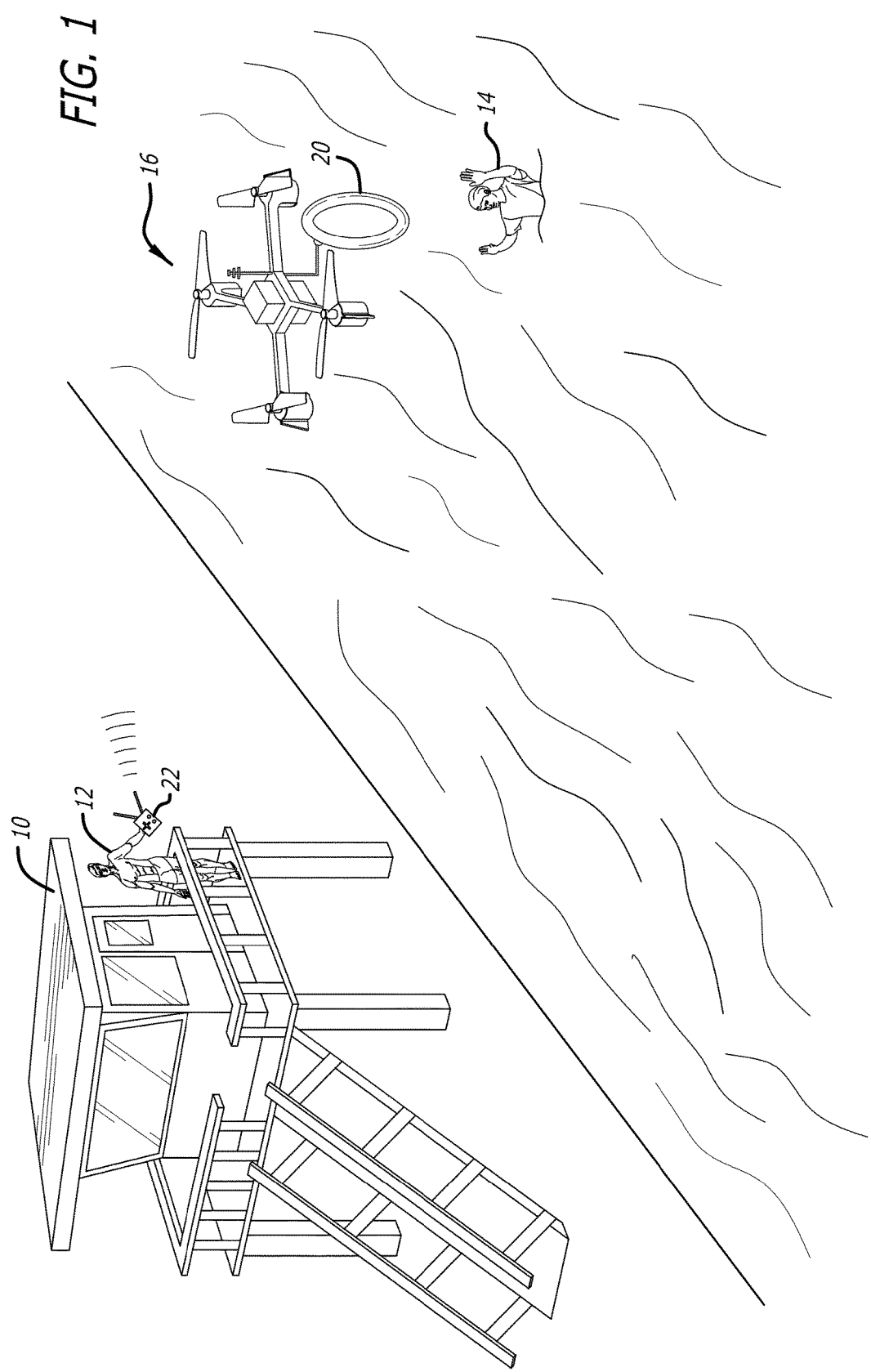
FIG. 1 is an illustration of a swimmer in distress in proximity with a life guard station.

FIG. 1 illustrates a situation that is frequently encountered by life guards and rescue personnel. A life guard station 10 on a shore of a body of water, such as a beach, is typically elevated so that a life guard 12 can observe a wide field of the shore and the swimmers in the water. If a swimmer 14 should become distressed and require aid, the life guard may dispatch a drone 16 from the life guard station 10 to the distressed swimmer 14 for delivery of a buoyant flotation device 20 such as a life preserver, life jacket, life buoy, or other buoyant device. The life guard or emergency personnel flies the drone 16 over the distressed swimmer 14, and then releases the life preserver 20 using a release mechanism to drop the life preserver to the distressed swimmer. This allows the rescue personnel to deliver the emergency equipment in a far shorter time than that which would be possible if the life guard needed to swim to the distressed swimmer.

Figure 2:
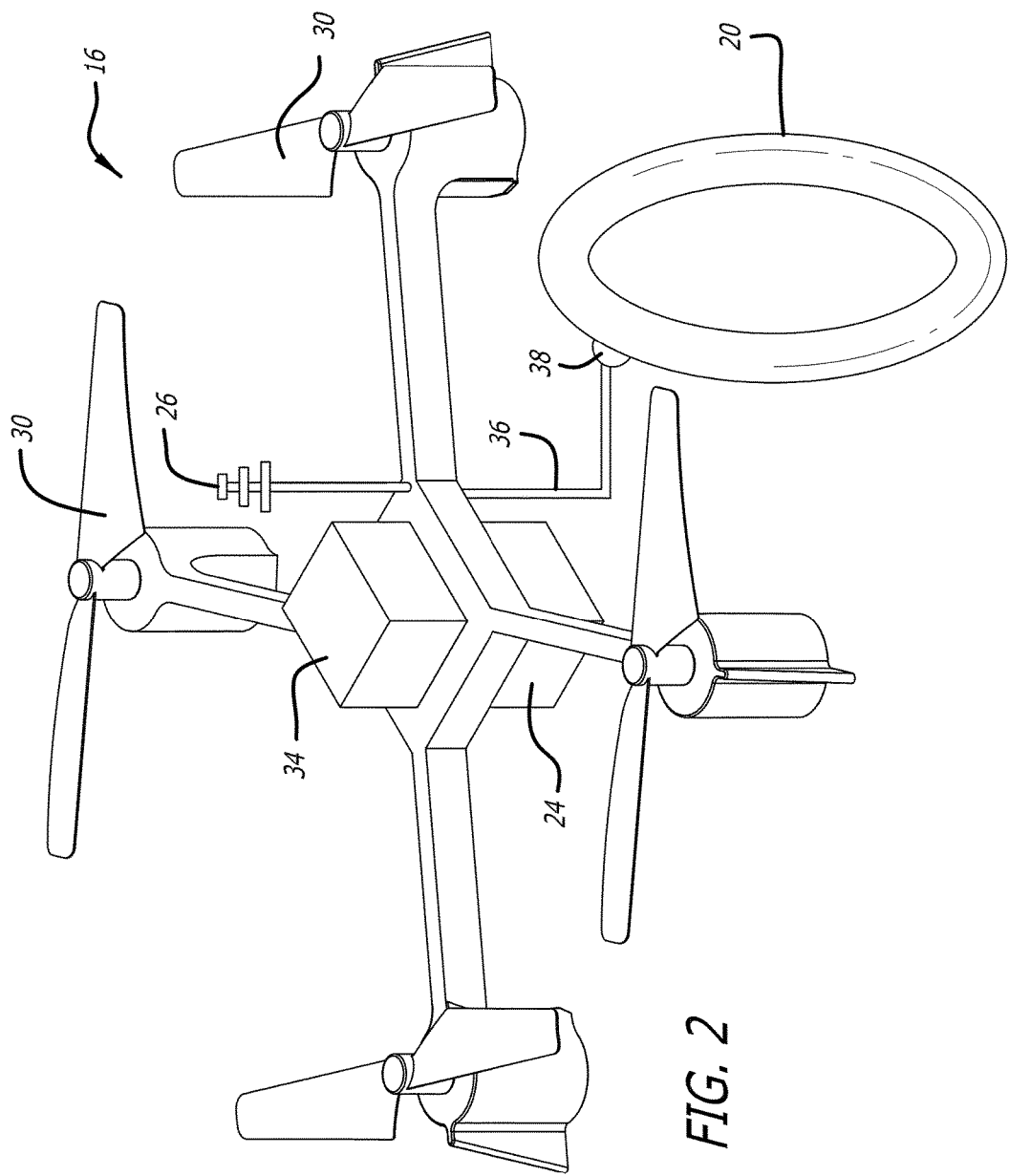
FIG. 2 is an elevated, perspective view of a first preferred embodiment of the present invention.

FIG. 2 is a first preferred embodiment of the present invention, which comprises a drone in the form of a quadcopter 16. Quadcopters are a type of unmanned aerial vehicles that are controlled remotely by a control box 22 that sends signals and receives data from the quadcopter, such as digital images from a camera 24 mounted below the quadcopter 16. The quadcopter may also be equipped with a GPS antenna 26 for positioning the drone according to GPS signals received from GPS satellites. Quadcopters include four simultaneously rotating rotors 30 that provide both lift and stability control (yaw) to the vehicle, where the rotors are gimballed to provide control over the movement of the drone 16. The gimbals and the motors that rotate the rotors are controlled by a central computer board (not shown) that also controls the camera and receives information from the GPS antenna, and exchanges information with the remote control device 22.

The drone 16 is further equipped with a vacuum pump 34 including a valve that is normally open, the vacuum pump 34 being operably connected to the power supply of the drone 16, for generating a vacuum that is used to attach and release a buoyant flotation device 20. The vacuum pump 34 supplies a negative pressure (vacuum) along a tube 36 to a suction cup 38. The suction cup may attach directly to the flotation device 20, or there may be a smooth, planar object such as a plate that is mounted on the flotation device to provide a compatible smooth surface for preserving a negative pressure in the suction cup. The vacuum pump is electrically connect to the power source with a relay switch that may also be controlled by the remote control 22, such that the switch is normally open but when the drone is started up the switch closes to power to vacuum pump 34. The activation of the vacuum pump closes the valve and causes a vacuum to build in the suction cup 38. The suction cup 38 serves to releasably attach the life preserver or other flotation device 20 to the drone 16. Once the drone is positioned over the swimmer 14, the user toggles the switch on the remote 22, causing a valve adjacent the suction cup or in the vacuum pump to open and release the negative pressure in the line 36, resulting in the suction cup's 38 pressure equalizing with the ambient pressure. The weight of the life preserver 20 will overcome the residual negative pressure and cause the life preserver 20 to drop onto or adjacent the swimmer 14, allowing the swimmer to retrieve the life preserver and keep above the surface of the water until help can arrive.

There are many types of drones that are suitable for this purpose, and the invention is not limited to quadcopters or any specific type of drone. As long as the drone can be operated remotely and can lift and carry a life preserver or other flotation device while operating regularly, the drone will meet the requirements of this invention. Moreover, other vacuum configurations can fill the role of the release mechanism other than those shown in the figure, and the attachment can be arranged in alternate manners using multiple connection points, multiple couplings, etc. Thus, the invention should not be construed as being limited to the described or depicted embodiments, but rather the invention's scope is governed by the appended claims using the ordinary meanings of the words used therein.

I claim:

1. A rescue device for delivering emergency apparatus to a distressed swimmer, comprising:
    an unmanned aerial vehicle controlled remotely by a control unit, the unmanned aerial vehicle comprising rotors for generating lift, and a camera;
    a vacuum pump including a conduit connected to a suction cup;
    a buoyant flotation member connected to the suction cup; and
    wherein the control unit disconnects the vacuum pump to release the buoyant flotation member from the unmanned aerial vehicle.

2. The rescue device of claim 1, wherein the buoyant flotation member is a toroidal life preserver.

3. The rescue device of claim 1, wherein the unmanned aerial vehicle is a quadcopter.

4. The rescue device of claim 1, further comprising multiple buoyant flotation members.

5. The rescue device of claim 1, wherein the buoyant flotation member includes substantially smooth plates for adhering to the suction cup.

6. The rescue device of claim 1, wherein a voltage to the vacuum pump is equivalent to a voltage to the rotors.

7. The rescue device of claim 1, wherein the control unit cuts off power to the vacuum pump.

8. The rescue device of claim 1, wherein the control unit releases a negative pressure holding the buoyant flotation member to the unmanned aerial vehicle.

\* \* \* \* \*